United States Patent
Dellon

(10) Patent No.: US 12,103,164 B2
(45) Date of Patent: Oct. 1, 2024

(54) GRIPPER MECHANISM

(71) Applicant: Boston Dynamics, Inc., Waltham, MA (US)

(72) Inventor: Brian Todd Dellon, West Roxbury, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/172,959

(22) Filed: Feb. 22, 2023

(65) Prior Publication Data

US 2023/0311341 A1 Oct. 5, 2023

Related U.S. Application Data

(63) Continuation of application No. 17/086,818, filed on Nov. 2, 2020, now Pat. No. 11,613,024.

(60) Provisional application No. 63/080,409, filed on Sep. 18, 2020.

(51) Int. Cl.
*B25J 15/00* (2006.01)

(52) U.S. Cl.
CPC ....... *B25J 15/0028* (2013.01); *B25J 15/0042* (2013.01)

(58) Field of Classification Search
CPC ... B25J 9/123; B25J 15/0616; Y10T 74/1508; Y10T 74/1518; Y10T 74/1521; Y10T 74/1523
USPC .......................................... 74/122, 124, 125
See application file for complete search history.

(56) References Cited

U.S. PATENT DOCUMENTS

| | | | |
|---|---|---|---|
| 3,630,391 A | 12/1971 | Wilson | |
| 4,765,668 A | 8/1988 | Slocum et al. | |
| 5,119,549 A | 6/1992 | Foote, Jr. et al. | |
| 6,056,281 A * | 5/2000 | Moilanen | B25J 15/0052 |
| | | | 269/34 |

(Continued)

FOREIGN PATENT DOCUMENTS

| CN | 111546366 | 8/2020 |
|---|---|---|
| EP | 3006168 | 4/2016 |

(Continued)

OTHER PUBLICATIONS

International Search Report & Written Opinion, Application No. US 2021/049570, dated Jan. 19, 2022, 16 pages.

(Continued)

*Primary Examiner* — Saul Rodriguez
*Assistant Examiner* — Brendan P Tighe
(74) *Attorney, Agent, or Firm* — Knobbe Martens Olson & Bear LLP

(57) ABSTRACT

A gripper mechanism includes a pair of gripper jaws, a linear actuator, and a rocker bogey. The linear actuator drives a first gripper jaw to move relative to a second gripper jaw. Here, the linear actuator includes a screw shaft and a drive nut where the drive nut includes a protrusion having protrusion axis expending along a length of the protrusion. The protrusion axis is perpendicular to an actuation axis of the linear actuator along a length of the screw shaft. The rocker bogey is coupled to the drive nut at the protrusion to form a pivot point for the rocker bogey and to enable the rocker bogey to pivot about the protrusion axis when the linear actuator drives the first gripper jaw to move relative to the second gripper jaw.

22 Claims, 7 Drawing Sheets

(56) References Cited

U.S. PATENT DOCUMENTS

| | | | |
|---|---|---|---|
| 6,176,533 B1* | 1/2001 | Moilanen | B25J 9/08 |
| | | | 294/203 |
| 7,854,456 B2 | 12/2010 | Waldorf et al. | |
| 9,440,353 B1* | 9/2016 | da Silva | B25J 9/1605 |
| 9,908,219 B2* | 3/2018 | Takahashi | B25B 5/087 |
| 9,969,082 B1* | 5/2018 | Berard | B25J 9/1661 |
| 10,603,800 B1* | 3/2020 | Claretti | B25J 15/0616 |
| 11,613,024 B2* | 3/2023 | Dellon | B25J 15/0028 |
| | | | 294/119.1 |
| 2002/0093211 A1* | 7/2002 | Filipiak | B25B 5/087 |
| | | | 294/203 |
| 2007/0241577 A1* | 10/2007 | Waldorf | B25J 15/0226 |
| | | | 294/203 |
| 2008/0078030 A1 | 4/2008 | Lee et al. | |
| 2021/0001496 A1* | 1/2021 | Yen | B25J 15/0206 |

FOREIGN PATENT DOCUMENTS

| | | | |
|---|---|---|---|
| JP | H04135192 A | 5/1992 | |
| JP | 2009039809 A | 2/2009 | |
| JP | 2009297886 A | 12/2009 | |

OTHER PUBLICATIONS

Odhner et al. "Precision grasping and manipulation of small objects from flat surfaces using underactuated fingers," May 14, 2012, 6 pages.

\* cited by examiner under 35 U.S.C. § 119(e) to U.S. Provisional
GRIPPER MECHANISM

CROSS REFERENCE TO RELATED APPLICATIONS

This U.S. patent application is a continuation of U.S. application Ser. No. 17/086,818, filed Nov. 2, 2020, which claims priority under 35 U.S.C. § 119(e) to U.S. Provisional Application No. 63/080,409, filed on Sep. 18, 2020. The disclosure of each of these prior applications is considered part of the disclosure of this application and is hereby incorporated by reference in its entirety.

TECHNICAL FIELD

This disclosure relates to a gripper mechanism.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to program robots in a quick and an efficient manner for various behaviors provides additional benefits to such industries.

SUMMARY

One aspect of the disclosure provides a robot that includes a body, an arm, and a gripper mechanism. The arm is coupled to the body. The gripper mechanism is coupled to the arm. The gripper mechanism includes a pair of gripper jaws, a linear actuator, and a rocker bogey. The linear actuator drives a first gripper jaw to move relative to a second gripper jaw. Here, the linear actuator includes a screw shaft and a drive nut where the drive nut includes a protrusion having protrusion axis expending along a length of the protrusion. The protrusion axis is perpendicular to an actuation axis of the linear actuator along a length of the screw shaft. The rocker bogey is coupled to the drive nut at the protrusion to form a pivot point for the rocker bogey and to enable the rocker bogey to pivot about the protrusion axis when the linear actuator drives the first gripper jaw to move relative to the second gripper jaw.

Implementations of the disclosure may include one or more of the following optional features. In some implementations, the robot also includes a carrier coupled to the drive nut and at least partially enclosing the drive nut where the carrier includes an anti-rotation mechanism configured to constrain the rocker bogey when the rocker bogey pivots about the pivot point. In some examples, the robot further includes a cam coupling the linear actuator to the first gripper jaw where the cam includes an involute slot configured to receive a portion of the rocker bogey. In some configurations, the robot includes a carrier coupled to the drive nut and at least partially enclosing the drive nut and a cam coupled to the linear actuator to the first gripper jaw. In these configurations, the carrier includes an anti-rotation mechanism and a hard stop shaft where the anti-rotation mechanism is configured to constrain the rocker bogey when the rocker bogey pivots about the pivot point. In these same configurations, the cam includes an involute slot and a hardstop slot where the involute slot is configured to receive a portion of the rocker bogey and where the hard stop slot is configured to receive the hard stop shaft of the carrier. The hardstop slot may have a slot length corresponding to a range of motion for the first jaw to move relative to the second jaw.

In some examples, the drive nut also includes an arcuate top surface facing the rocker bogey. The arcuate top surface may be shaped to receive a bottom surface of the rocker bogey facing the drive nut. In these examples, the rocker bogey may couple to the protrusion by mounting on the protrusion and an interface between the arcuate top surface of the drive nut and the bottom surface of the rocker bogey includes a gap when the rocker bogey is in a neutral position. Here, in a biased position, the rocker bogey contacts at least a portion of the arcuate top surface of the drive nut. The biased position results from the rocker bogey pivoting about the protrusion.

Optionally, the second gripper jaw of the gripper mechanism may be fixed. The robot may include four legs coupled to the body. The robot may also include a gripper controller configured to control motion of the linear actuator along the screw shaft to drive the first gripper jaw to move relative to the second gripper jaw. Here, the rocker bogey may pivot about the protrusion axis independent of the motion control of the linear actuator by the gripper controller.

Another aspect of the disclosure provides a system for gripping. The system includes a pair of gripper jaws, a linear actuator, and a rocker bogey. The linear actuator drives a first gripper jaw to move relative to a second gripper jaw. Here, the linear actuator includes a screw shaft and a drive nut where the drive nut includes a protrusion having protrusion axis expending along a length of the protrusion. The protrusion axis is perpendicular to an actuation axis of the linear actuator along a length of the screw shaft. The rocker bogey is coupled to the drive nut at the protrusion to form a pivot point for the rocker bogey and to enable the rocker bogey to pivot about the protrusion axis when the linear actuator drives the first gripper jaw to move relative to the second gripper jaw.

Implementations of the disclosure may include one or more of the following optional features. In some implementations, the system also includes a carrier coupled to the drive nut and at least partially enclosing the drive nut where the carrier includes an anti-rotation mechanism configured to constrain the rocker bogey when the rocker bogey pivots about the pivot point. In some examples, the system further includes a cam coupling the linear actuator to the first gripper jaw where the cam includes an involute slot configured to receive a portion of the rocker bogey. In some configurations, the system includes a carrier coupled to the drive nut and at least partially enclosing the drive nut and a cam coupled to the linear actuator to the first gripper jaw. In these configurations, the carrier includes an anti-rotation mechanism and a hard stop shaft where the anti-rotation mechanism is configured to constrain the rocker bogey when the rocker bogey pivots about the pivot point. In these same configurations, the cam includes an involute slot and a hardstop slot where the involute slot is configured to receive a portion of the rocker bogey and where the hard stop slot is configured to receive the hard stop shaft of the carrier. The hardstop slot may have a slot length corresponding to a range of motion for the first jaw to move relative to the second jaw.

In some examples, the drive nut also includes an arcuate top surface facing the rocker bogey. The arcuate top surface may be shaped to receive a bottom surface of the rocker bogey facing the drive nut. In these examples, the rocker bogey may couple to the protrusion by mounting on the protrusion and an interface between the arcuate top surface of the drive nut and the bottom surface of the rocker bogey includes a gap when the rocker bogey is in a neutral position. Here, in a biased position, the rocker bogey contacts at least a portion of the arcuate top surface of the drive nut. The biased position results from the rocker bogey pivoting about the protrusion away from the neutral position.

Optionally, the second gripper jaw of the gripper mechanism may be fixed. The rocker bogey may be configured to pivot about the protrusion axis independently of linear motion of the linear actuator along the screw shaft.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
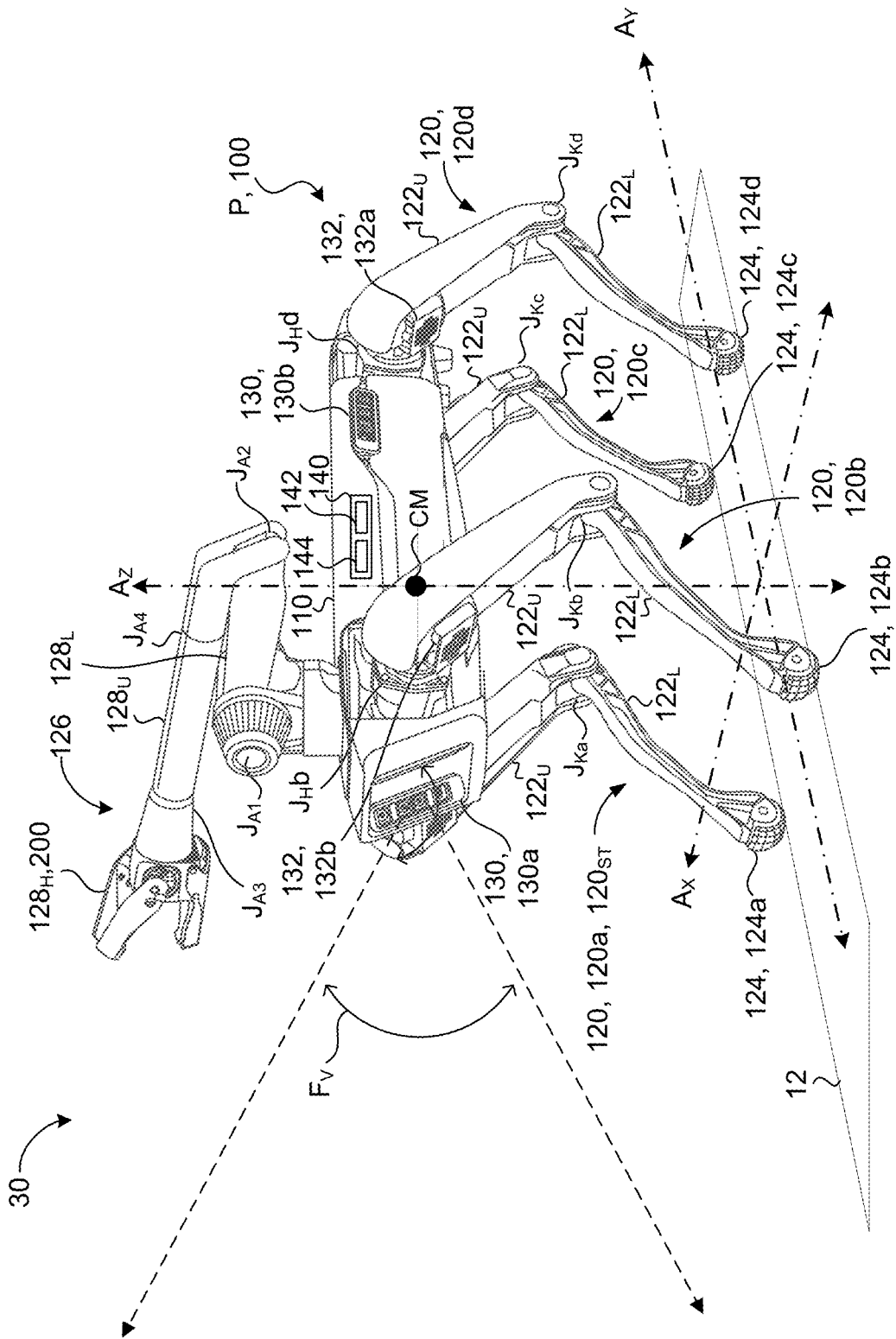
FIG. 1A is a schematic view of an example robot with a gripper mechanism.
Figure 1B:
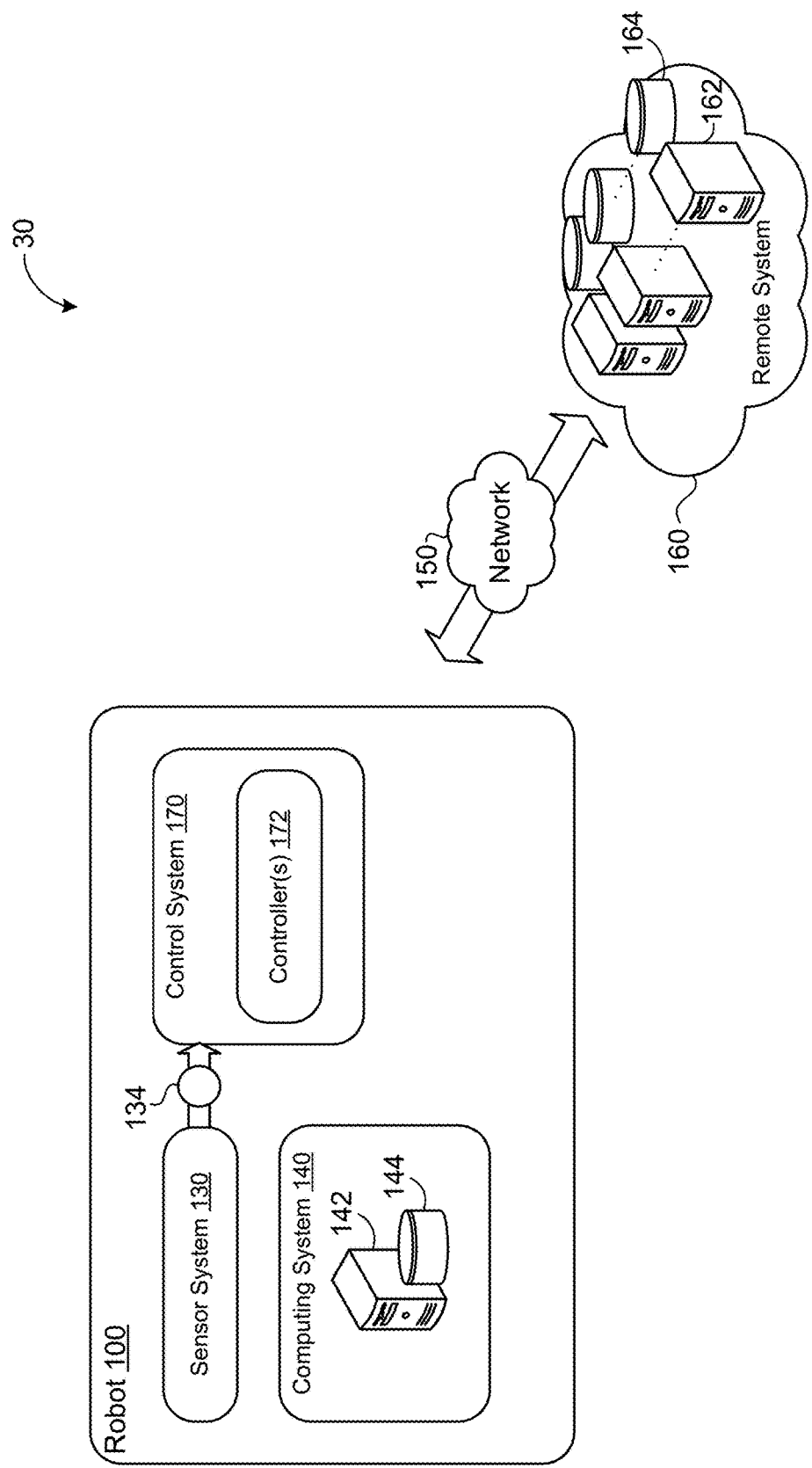
FIG. 1B is a schematic view of an example system of the robot of FIG. 1A.

Referring to FIGS. 1A and 1B, the robot 100 includes a body 110 with locomotion based structures such as legs 120a-d coupled to the body 110 that enable the robot 100 to move about the environment 30. In some examples, each leg 120 is an articulable structure such that one or more joints J permit members 122 of the leg 120 to move. For instance, each leg 120 includes a hip joint JH coupling an upper member 122, $122_U$ of the leg 120 to the body 110 and a knee joint JK coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1 depicts the arm 126 with three members 128 corresponding to a lower member $128_L$, an upper member $128_U$, and a hand member $128_H$ (e.g., shown as a mechanical gripper 200). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ is a mechanical gripper 200 that is configured to perform different types of grasping of elements within the environment 30. In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 128 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 30 or to perform tasks using the arm 126, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view Fv defining a sensing range or region corresponding to the sensor 132. For instance, FIG. 1A depicts a field of a view Fv for the robot 100. Each sensor 132 may be pivotable and/or rotatable such that the sensor 132 may, for example, change the field of view Fv about one or more axis (e.g., an x-axis, a y-axis, or a z-axis in relation to a ground plane).

When surveying a field of view Fv with a sensor 132, the sensor system 130 generates sensor data 134 (also referred to as image data) corresponding to the field of view Fv. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member 126H relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 is stores, processes, and/or to communicates the sensor data 134 to various systems of the robot 100 (e.g., the control system 170 and/or the maneuver system 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170. The control system 170 may be configured to communicate with systems of the robot 100, such as the at least one sensor system 130. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the art 126 to perform various tasks using the gripper 200. For instance, at least one controller 172 controls a gripper actuator 300 that operates the gripper 200 to manipulate an object or element in the environment 30.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$ or gripper 200) of the robot 100. By controlling one or more joints J, actuators (e.g., the actuator 300), or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120a-b, four legs 120a-d, or two legs 120a-b combined with the arm 126.

Figure 2:
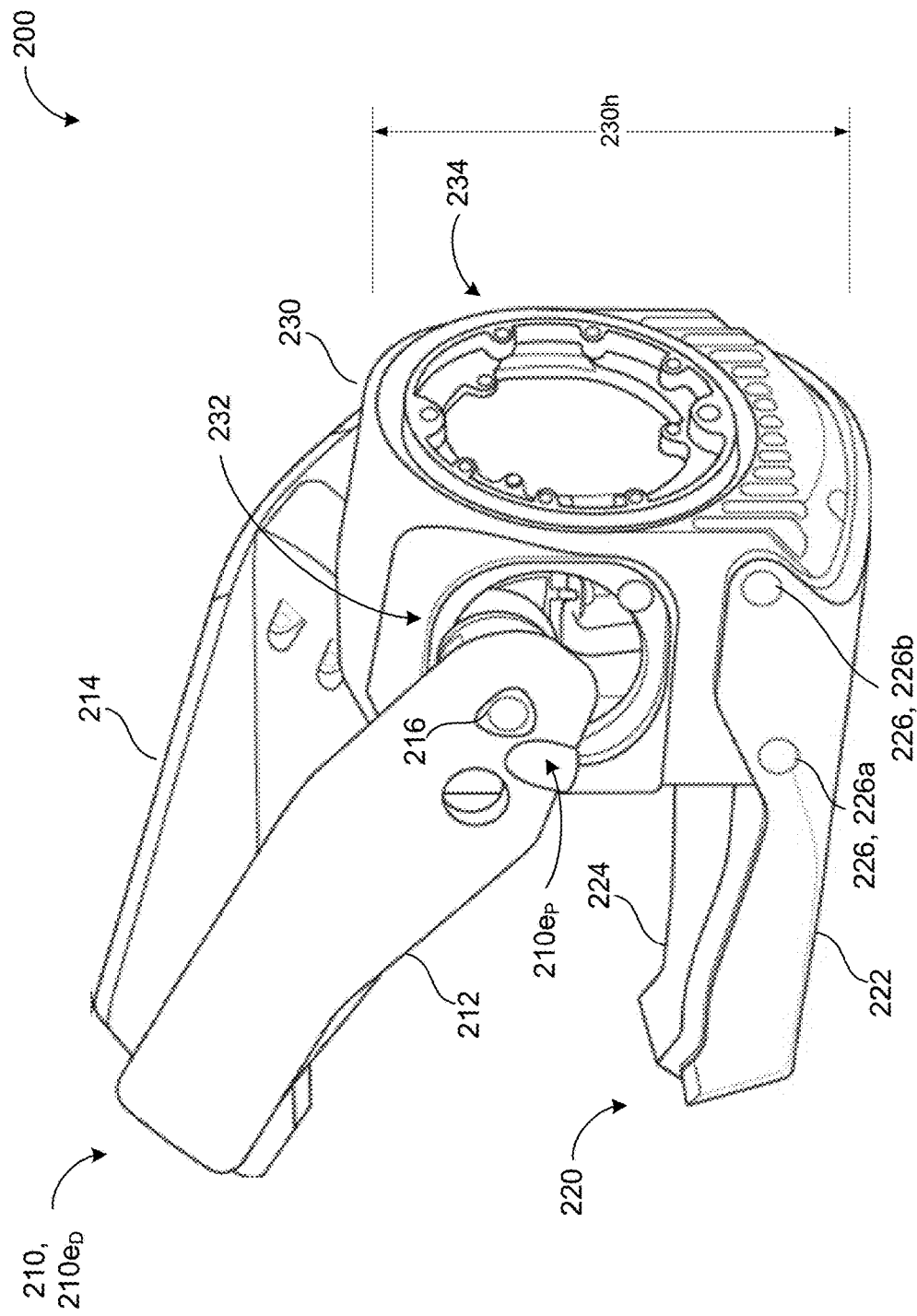
FIG. 2 is a perspective view of an example gripper mechanism for the robot of FIG. 1A.

In some examples, the end effector of the arm 126 is a mechanical gripper 200 (also referred to as a gripper 200). Generally speaking, a mechanical gripper is a type of end effector for a robotic manipulator that may open and/or close on a workpiece that is an element or object within the environment 30. When a mechanical gripper closes on a workpiece, jaws of the mechanical gripper generate a compressive force that grasps or grips the workpiece. Typically, the compressive force is enough force to hold the workpiece (e.g., without rotating or moving) within a mouth between the jaws of the gripper. Referring to FIG. 2, the gripper 200 includes a top jaw 210 and a bottom jaw 220 configured to grasp or to grip an object in order to manipulate the object to perform a given task. Although each jaw 210, 220 of the gripper 200 may be configured to actuate in order to compress the jaws 210, 220 against an object, the gripper 200 of FIG. 2 illustrates the top jaw 210 that is a movable jaw to pivot about a pivot point and a bottom jaw 220 that is a fixed jaw. Therefore, the top jaw 210 may move up or down as it rotates about pivot point. Colloquially speaking, the mouth of the gripper 200 refers to the space between the top jaw 210 and a bottom jaw 220. As the movable top jaw 210 rotates downward toward the fixed bottom jaw 220, the mouth of the gripper 200 closes and the movable top jaw 210 may compress an object into the fixed bottom jaw 220 when the object is located in the mouth of the gripper 200. The top jaw 210 includes a proximal end $210e_p$ located adjacent to the pivot point for the top jaw 210 and a distal end $210e_d$ opposite the proximal end $210e_p$. In some examples, the top jaw 210 includes a first side frame 212 and a second side frame 214. The first side frame 212 may be arranged such that a plane corresponding to the surface of the first side frame 212 converges with a plane corresponding to a surface of the second side frame 214 at the distal end 210ca of the top jaw 210 to resemble the jaw-like structure of the top jaw 210. Here, the first side frame 212 and the second side frame 214 converge or mechanically come together in some manner at the distal end 210ca of the top jaw 210. In some examples, at the proximal end $210e_p$ of the top jaw 210, the top jaw 210 includes a top jaw pin 216 that is configured to allow the top jaw 210 to rotate about an axis of the top jaw pin 216 and also couple to a gripper actuator 300, such that the gripper actuator 300 may drive the top jaw 210 along its range of motion (e.g., an arched range of motion to open and/or to close the mouth of the gripper 200).

The top jaw 210 may also function as a linear differential. To function as a linear differential, the top jaw 210 may be divided into more than one top jaw portion that is able to move to some degree independently of the other top jaw portions as the gripper 200 grips an object. For example, when the top jaw 210 is two components instead of a single unitary component as shown in FIG. 2, one top jaw component may be located near and connect to the first side frame 212 while a second top jaw component may be located near and connect to the second side frame 214. In this example, if the gripper 200 encounters an irregularly shaped object in its mouth, each portion of the top jaw 210 may be able to better conform (or adjust) to the irregular surface of the irregularly shaped object. In other words, if the object was somewhat rounded, different portions of the top jaw 210 would be able to close to different degrees to conform to the rounded surface more closely. This means that, across the top jaw 210, each portion of the top jaw 210 may be at a different height from the bottom jaw 220 (e.g., when gripping an object); creating the differential aspect of the gripper 200. In contrast, a unitary top jaw 210 that did not function as a linear differential would maintain a relatively uniform height across its surface from the top jaw 210 to the bottom jaw 220. This would mean that the top jaw 210 would conform to less of the surface of a rounded object because the top jaw 210 would contact the object at a tangent point on the surface of the rounded object and would need to deform the object to increase its surface contact. Since the gripper 200 may be used to grip a wide range of objects or to perform a wide range of manipulation tasks, a linear differential version of the gripper 200 may be advantageous for some tasks where the gripper 200 encounters, for example, irregularly shaped objects.

In some implementations, the top jaw pin 216 couples the top jaw 210 to an actuator housing 230 that houses the gripper actuator 300. The actuator housing 230 may include an opening 232 to receive the top jaw 210 in order to allow the top jaw 210 to pivot about the axis of the top jaw pin 216. In other words, the opening 232 is a hole in a side wall of the housing 230 where the hole aligns with the axis of the top jaw pin 216. In some configurations, a top jaw pin 216 as a single pin that extends from the first side frame 212 to the second side frame 214 through a first and a second opening 232 on each side of the housing 230. In other configurations, each side frame 212, 214 may have its own top jaw pin 216 where the top jaw pin 216 of the first side frame 212 is coaxial with the top jaw pin 216 of the second side frame 214. In some configurations, the actuator housing 230 includes a connector socket 234. The connector socket 234 is configured allow the gripper 200 to couple (or decouple) with part of the arm 126 that includes a mating socket to match the connector socket 234.

In some examples, the connector housing 230 has a height 230h that extends from the top jaw 210 to the bottom jaw 220. For example, the fixed jaw or bottom jaw 220 attaches to the connector housing 230 at an end of the connector housing 230 opposite the top jaw 210. For instance, FIG. 2 depicts the bottom jaw 220 affixed to the connector housing 230 by at least one bottom jaw pin 226 (e.g., shown as a first bottom jaw pin 226, 226a and a second bottom jaw pin 226, 226b).

When the gripper 200 grips an object, the object may impart reaction forces on the gripper 200 proportional to the compressive force of the gripper 200. Depending on the shape of the object, one side of the gripper 200 may experience a greater reaction force than another side of the gripper 200. Referring to the construction of the gripper depicted in FIG. 2, this means that the first side frame 212 may experience a different reaction force than the second side frame 214. With a different reaction force between the first side frame 212 and the second side frame 214, the reaction force will inherently impart some amount of torque at the top jaw pin 216. Since the top jaw pin 216 couples the top jaw 210 to a gripper actuator 300, the gripper actuator 300 also receives some portion of this torque. Unfortunately, the gripper actuator 300 may move the top jaw 210 by translating linear motion of the gripper actuator 300 into rotational motion. When the linear motion of the gripper actuator 300 occurs along a linear path, the amount of torque experienced by the gripper actuator 300 resulting from the reaction forces on the gripper 200 introduces stress to the gripper actuator 300. When the gripper actuator 300 includes a linear actuator such as a linear ball screw, the stress that the torque introduces may stress the threads of the screw shaft; potentially even causing the drive member of the linear actuator to bind against the threads of the screw shaft. This problem may be even more detrimental to the operation of the gripper actuator 300 when the gripper actuator 300 uses a linear actuator with high precision that has fine pitched threads along the screw shaft. In other words, the fine pitch of the threads may increase the likelihood of wear or binding due to the torque imparted by the reaction forces.

Figure 3A:
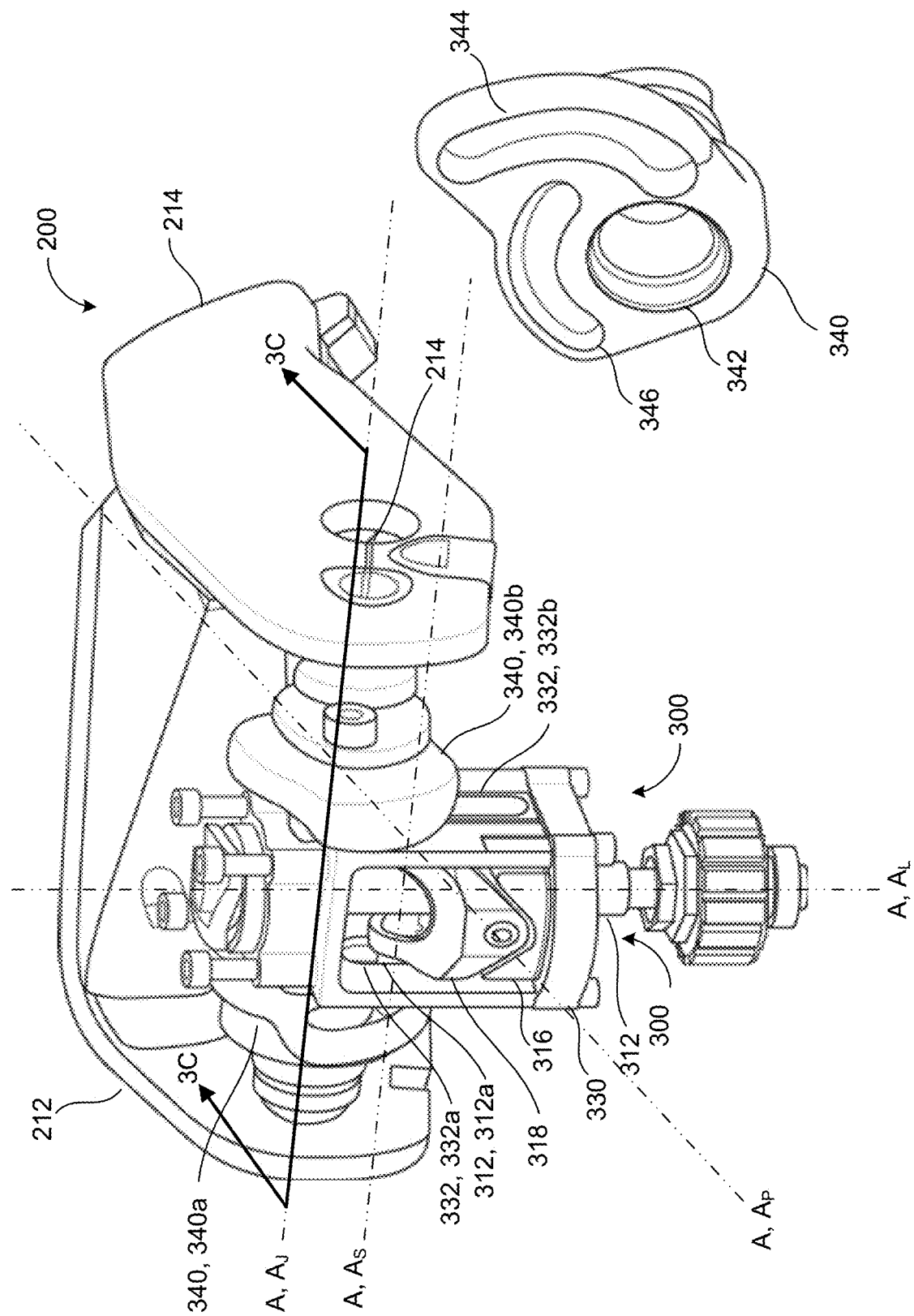
FIG. 3A is a perspective view of an example jaw actuator for the gripper mechanism of FIG. 2.
Figure 3B:
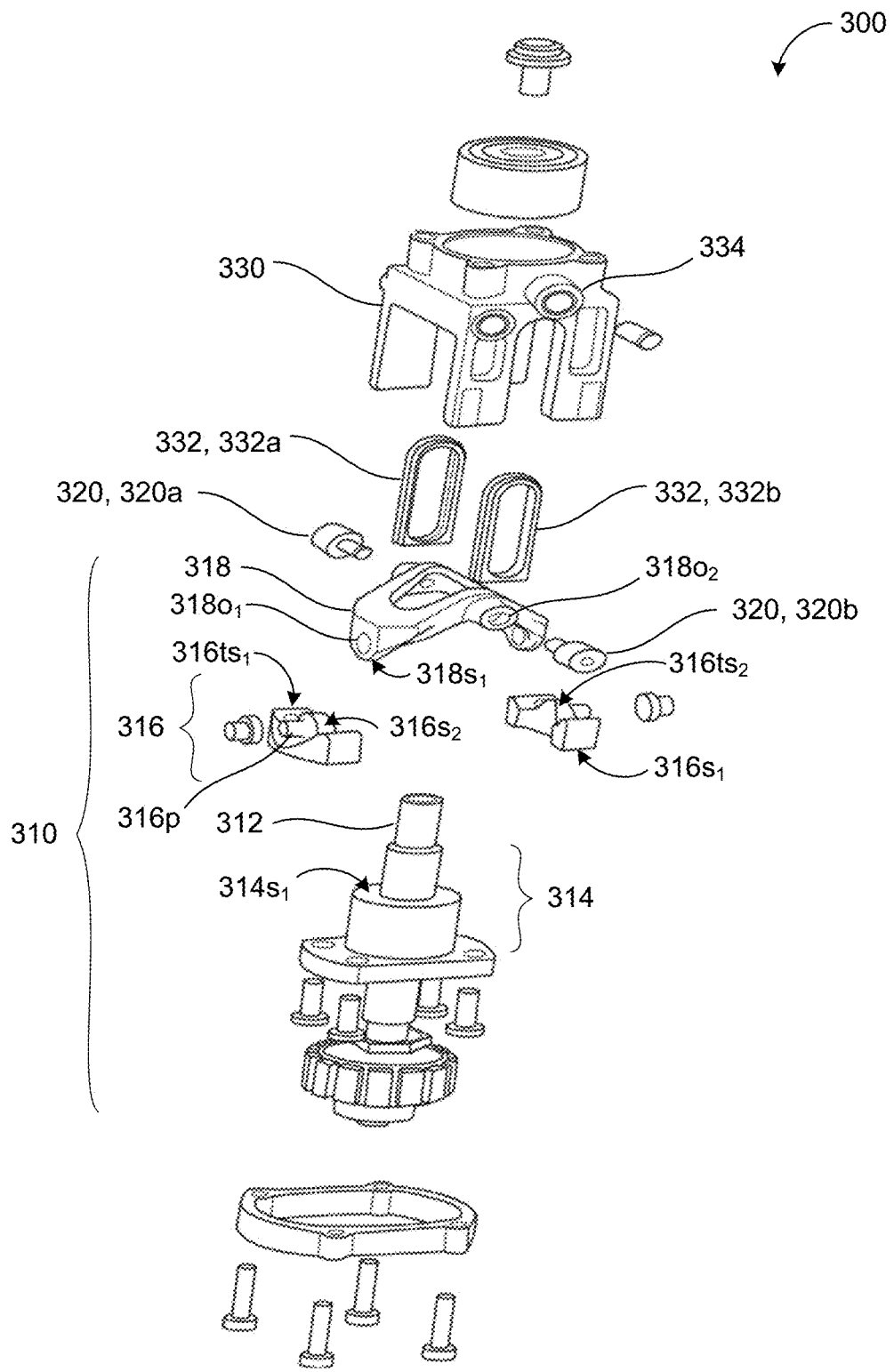
FIG. 3B is an exploded view of the jaw actuator for the gripper mechanism of FIG. 2.
Figure 3C:
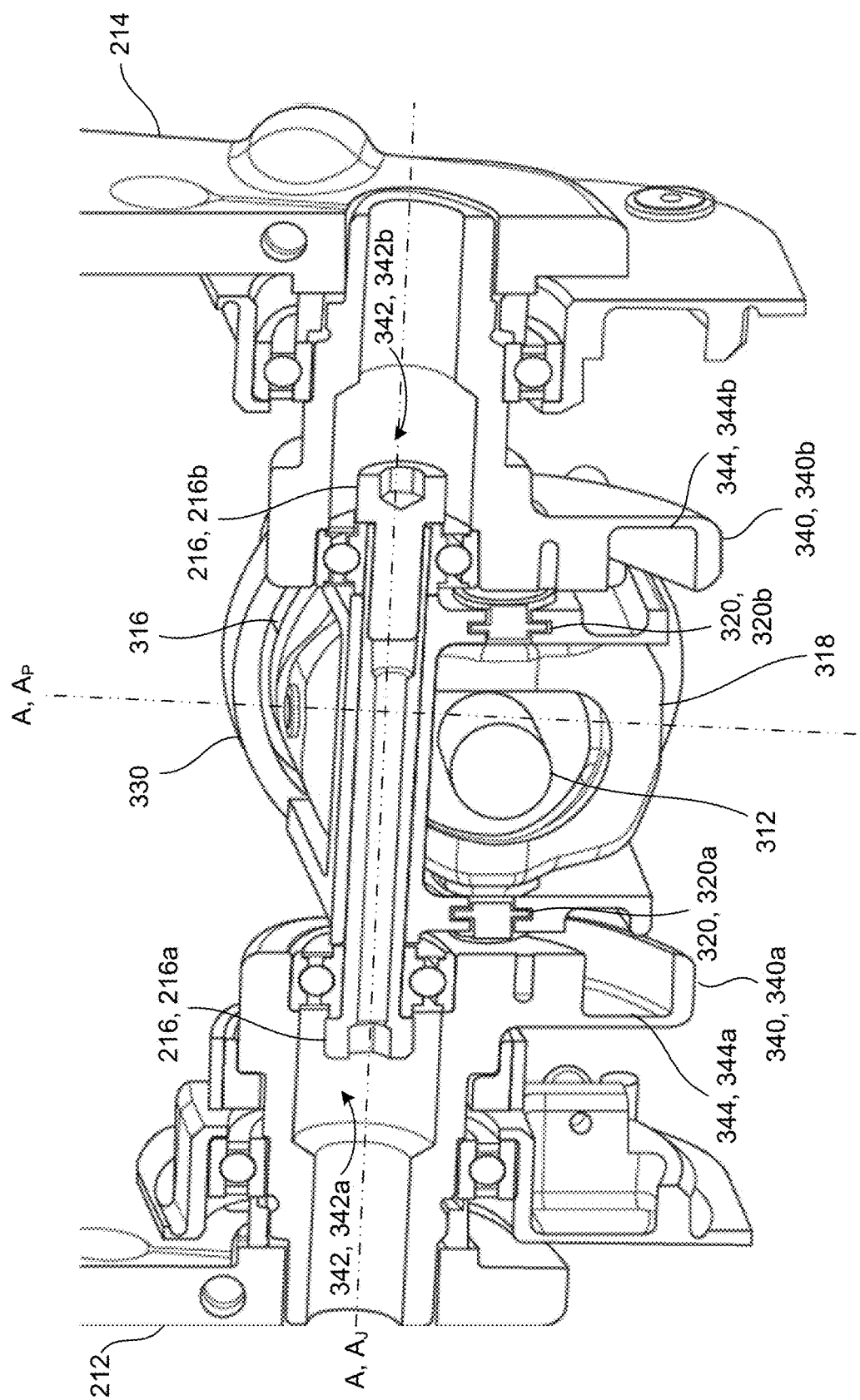
FIG. 3C is a cross-sectional view of the jaw actuator of FIG. 3A along the line 3C-3C.

To avoid a potentially damaging scenario caused by the torque imparted from the reaction forces, the gripper actuator 300 is configured to rock between a first side of the gripper actuator 300 facing the first side frame 212 and a second side of the gripper actuator 300 facing the second side frame 214 in order to prevent the linear actuator 310 of the gripper actuator 300 from experiencing the torque. Stated differently, the rocking motion of the gripper actuator 300 absorbs, minimizes, or entirely diminishes the torque that would otherwise be experienced by the linear actuator 310. To provide this safety feature, FIGS. 3A-3C depict that the gripper actuator 300 includes a linear actuator 310, a rocker shaft 320, a carrier 330, and a cam 340.

A linear actuator, such as the linear actuator 310, is an actuator that transfers rotary motion (e.g., the clockwise or counterclockwise rotation of the linear actuator 310) into generally linear motion. To accomplish this linear motion, the linear actuator 310 includes a driveshaft 312 (also referred to as a shaft 312) and a ball nut 314. The shaft 312 may be a screw shaft (e.g., also referred to as a lead screw or a spindle) that rotates about an axis $A_L$ (also referred to as an actuation axis of the linear actuator 310) of the linear actuator 310 where the axis $A_L$ extends along a length of the linear actuator 310. The screw shaft 312 includes threads on an outer diameter of the shaft 312 that form a helical structure extending along some length of the shaft 312.

As a motor associated with the linear actuator 310 generates rotary motion, the linear actuator 310 rotates either clockwise or counterclockwise. When the linear actuator 310 rotates, the ball nut 314 disposed on the linear actuator 310 extends or retracts along the shaft 312 based on the rotary motion of the linear actuator 310. To extend/retract along the shaft 312, the ball nut 314 is seated on the threaded shaft 312 to ride in a track between the treads of the shaft 312. For instance, the ball nut 314 includes its own threads that mate with the threads of the shaft 312 such that the rotary motion of the shaft 312 drives the ball nut 314 in a direction along the actuation axis $A_L$.

In some examples, the linear actuator 310 includes a ball nut housing 316. The ball nut housing 316 may be part of (i.e., integral with) the ball nut 314 or a separate component that couples with or attaches to the ball nut 314. When the ball nut 314 and the ball nut housing 316 are separate components, a bottom surface 316$si$ of the ball nut housing 316 may mate with a top surface 314$si$ of the ball nut 314 to couple the ball nut 314 to the ball nut housing 316. For instance, FIG. 3B depicts the ball nut 314 in a flanged configuration where the ball nut 314 surrounds the shaft 312 and includes a first portion with a first outer diameter and a second portion with a second outer diameter that is less than the first outer diameter (e.g., a shape resembling to concentric cylinders that are concentric about the actuation axis $A_L$). Here, the difference in the diameters generates a rim or shoulder for the flanged configuration such that the top surface 314$_{TS}$ of the ball nut 314 is located on this shoulder. For orientation, when referring to a top (e.g., top surface) or a bottom (e.g., a bottom surface) of various components of the gripper actuator 300, "top" refers to a moveable jaw facing direction while "bottom" refers to a fixed bottom jaw facing direction.

In order to prevent unwanted torque from transferring to the shaft 312 and the ball nut 314 of the linear actuator 310, the linear actuator 310 includes a rocker bogey 318. The rocker bogey 318 is generally disposed on the ball nut 314 such that the rocker bogey 318 may rock (i.e., move) from side to side. In other words, the rocker bogey 318 is able to move towards the first side frame 212 and/or away from the first side frame 212 towards the second side frame 214 of the top jaw 210. To generate this rocking motion, the rocker bogey 318 may be coupled to the ball nut 314 indirectly by means of the ball nut housing 316. Alternatively, when the ball nut housing 316 is part of the ball nut 314, the rocker bogey 318 is directly attached to the ball nut 314.

In some examples, the coupling between the rocker bogey 318 and the ball nut housing 316 promotes the rocking motion by either one or both of (i) a shape of an interface between the rocker bogey 318 and the ball nut housing 316 or (ii) the connection between the rocker bogey 318 and the ball nut housing 316. As one such example, the ball nut housing 316 includes a trunnion saddle 316$ts$. A trunnion refers to a cylindrical protrusion that is used as a mounting and/or pivoting point. Here, the design of the ball nut housing 316 combines the structure of a trunnion with a saddle-shaped surface where a saddle refers to an arcuate portion of a surface that includes a saddle point. Referring to FIG. 3B, a top surface of the ball nut housing 316 includes a pair of trunnion saddles 316$ts_{1,2}$. With a trunnion saddle 316$_{TS}$, the ball nut housing 316 includes a protrusion 316$p$ forming a portion of the trunnion saddle 316$_{TS}$ that is configured to couple with the rocker bogey 318. For instance, the rocker bogey 318 includes an opening 318$o$ that receives the protrusion 316$p$ of the ball nut housing 316. By receiving the protrusion 316$p$ of the ball nut housing 316 in the opening 318$o$, the rocker bogey 318 may pivot about an axis of the protrusion 316$p$ (e.g., shown as the protrusion axis A, $A_P$ in FIGS. 3A and 3C) to rock from side to side.

In some implementations, the interface between the ball nut housing 316 and the rocker bogey 318 also promotes the ability of the rocker bogey 318 to move side to side. To promote the ability of the rocker bogey 318 to move side to side, the trunnion saddle 316$_{TS}$ of the ball nut housing 316 has an arcuate top surface 316$s_2$. For example, a portion of the top surface 316$s_2$ adjacent to the protrusion 316$p$ has a parabolic-shaped curvature. In this example, the rocker bogey 318 also includes a curved surface 318$s_1$ on a bottom side of the rocker bogey 318 facing the ball nut housing 316. The curved surface 318$s_1$ is generally a complimentary curve (e.g., a complimentary parabolic curve) with respect to the top surface 316$s_2$ of the ball nut housing 316 to provide an interface where the ball nut housing 316 and the rocker bogey 318 mesh together (e.g., shown as the interface between the top surface 316$s_2$ of the ball nut housing 316 and the bottom surface 318$s_1$ of the rocker bogey 318).

In some examples, the interface where the ball nut housing 316 and the rocker bogey 318 mesh together promotes the ability of the rocker bogey 318 to move side to side. For instance, at the interface, the arcuate top surface $316_{S2}$ of the ball nut housing 316 is offset from the curved surface $318_{S1}$ on the bottom side of the rocker bogey 318 facing the ball nut housing 316. This gap or offset may be proportional to the distance that the rocket bogey 318 is able to pivot about the protrusion 316p. For instance, when the rocker bogey 318 moves to one side, the rocker bogey 318 closes or reduces the gap on that side of the protrusion 316p. When the rocker bogey 318 is in a neutral position or a position where the rocket bogey 318 is centered within the trunnion saddle $316_{TS}$ of the ball nut housing 316, the gap occurs along the entire interface between the rocker bogey 318 and the ball nut housing 316. Here, when the rocker bogey 318 pivots to a biased position, at least a portion of the gap is reduced at the interface between the rocker bogey 318 and the ball nut housing 316. In some examples, the rocker bogey 318 is able to pivot to a biased position where a portion of the rocker bogey 318 contacts the ball nut housing 316 (e.g., at the acuate top surface $316_{S2}$). This interference with the ball nut housing 316 may allow the ball nut housing 316 to serve as a movement limit or stop for the pivoting motion of the rocker bogey 318. In other words, the arcuate top surface $316_{S2}$ or saddle of the ball nut housing 316 is able to both promote the rocking motion of the rocker bogey 318 (e.g. by the gap/offset at the interface) while also acting as some form of constraint for the rocker bogey 318 (e.g., a movement limit).

As shown in FIGS. 3A-3C, the rocker bogey 318 also includes a pair of second openings $318o_2$ that receive the rocker shaft 320 (e.g., shown as a first rocker shaft 320, 320a and a second rocker shaft 320b). The rocker shaft 320 may be inserted into the pair of second openings $318o_2$ such that the rocker shaft 320 couples to the rocker bogey 318 by aligning a center of the second opening $318o_2$ with a longitudinal axis along the rocker shaft 320 (e.g., shown as a shaft axis A, $A_S$ in FIG. 3A) that is perpendicular to the protrusion axis $A_P$. While the rocker shaft 320 is seated in the second opening $318o_2$, each end of the rocker shaft 320 may translate in a direction along the actuation axis $A_L$. When the rocker shaft 320 moves along the actuation axis $A_L$, the rocker shaft 320 is positioned to engage with the cam 340 to translate the linear motion along the actuation axis $A_L$ to rotary motion.

In some configurations, the linear actuator 310 is at least partially enclosed in a carrier 330. The carrier 330 may refer to a frame attached to the ball nut 314 or ball nut housing 316 (e.g., by fasteners) that surrounds, or is offset from, the shaft 312 of the linear actuator 310. The carrier 330 generally functions to constrain the side to side movement of the rocker bogey 318 (i.e., serves as an anti-rotation mechanism). Since the rocker bogey 318 may rotate about the protrusion axis $A_P$ by pivoting on the protrusion 316p, the carrier 330 includes slots or rails that at least partially constrain the rocker bogey 318. For example, the rocker shaft 320, which is coupled to the rocker bogey 318 rides in a slot 332 of the carrier 330 as the rocker bogey 318 and the carrier 330 move along the shaft 312 of the linear actuator 310 together. FIG. 3B illustrates that a first slot 332, 332a constrains the first rocker shaft 320a on a side of the gripper actuator 300 that faces the first side frame 212 of the top jaw 210 and a second slot 332, 332b constrains the second rocker shaft 320b on an opposite side of the gripper actuator 300 that faces the second side frame 214 of the top jaw 210. In some configurations, the portion of the rocker shaft 320 that engages with the slot 332 or rails of the carrier 330 includes one or more bearings. By having bearings located where the rocker shaft 320 may engage with the carrier 330, the bearings enable minimal or low friction to ensure that motion of the rocker bogey 318 does not result in a detrimental amount of drive energy being lost in translation from the linear actuator 310 to the moveable jaw 210 (e.g., via the cam 340).

The cam 340 includes a jaw engaging opening 342, an involute slot 344, and a hard stop slot 346. As shown in FIGS. 3A and 3C, the rocker shaft 320 engages with the cam 340 by protruding into and riding along the involute slot 342. Stated differently, the cam 340 is in a position that align the involute slot 342 with the rocker shaft 320 so that walls of the involute slot 342 surround the rocker shaft 320. As the linear actuator 310 actuates, the rocker shaft 320 travels towards either end of the involute slot 342. When the rocker shaft 320 reaches either end of the involute slot 342, the linear actuation 310 continues to move and causes the rocker shaft 320 to impart a force on an end of the involute slot 342 that drives the cam 340 to rotate the moveable jaw 210 through its arc of motion. For instance, when the linear actuator 310 moves towards the top jaw 210, the cam 340 rotates the top jaw 210 downwards towards the bottom jaw 220 to close the mouth of the gripper 200. On the other hand, when the linear actuator 310 moves away from the top jaw 210 (e.g., towards the bottom jaw 220), the cam 340 rotates the top jaw 210 away from the bottom jaw 220 to open the mouth of the gripper 200.

In order to enable the linear actuator 310 to drive the moveable jaw 210 open or closed, the jaw engaging opening 342 of the cam 340 receives the top jaw pin 216. By the jaw engaging opening 342 of the cam 340 receiving the top jaw pin 216, the moveable jaw 210 is affixed to the cam 340. With this fixed point, the moveable jaw 210 has a pivot point to pivot about a jaw pivot axis A, $A_J$. For example, FIG. 3C illustrates a first jaw pin 216a coupling to a first cam 340, 340a in a first opening 342, 342a on a side of the gripper actuator 300 facing the first side frame 212 and a second jaw pin 216b coupling to a second cam 340, 340b in a second opening 342, 342b on an opposite side of the gripper actuator 300 facing the second side frame 214.

In some configurations, the cam 340 includes the hardstop slot 346 that is configured to constrain an amount of the range of motion (ROM) of the top jaw 210. To constrain of the top jaw 210, the carrier 330 includes an end stop 334. For instance, FIG. 3B illustrates the carrier 330 with a pair of end stops 334 at an end of each slot 332 that is opposite the rocker bogey 318. When the cam 340 connects to the top jaw 210, each cam 340 is positioned such that the end stop 334 is seated within the hardstop slot 346 of the respective cam 340 (e.g., walls of the hardstop slot 346 surround the end stop 334). As the rocker shaft 320 drives the cam 340, the end stop 334 travels in the hardstop slot 346. When the end stop 334 reaches either end of the hardstop slot 346, the interference of the end stop 334 and an end of the hardstop slot 346 prevents further rotation of the cam 340.

Figure 4:
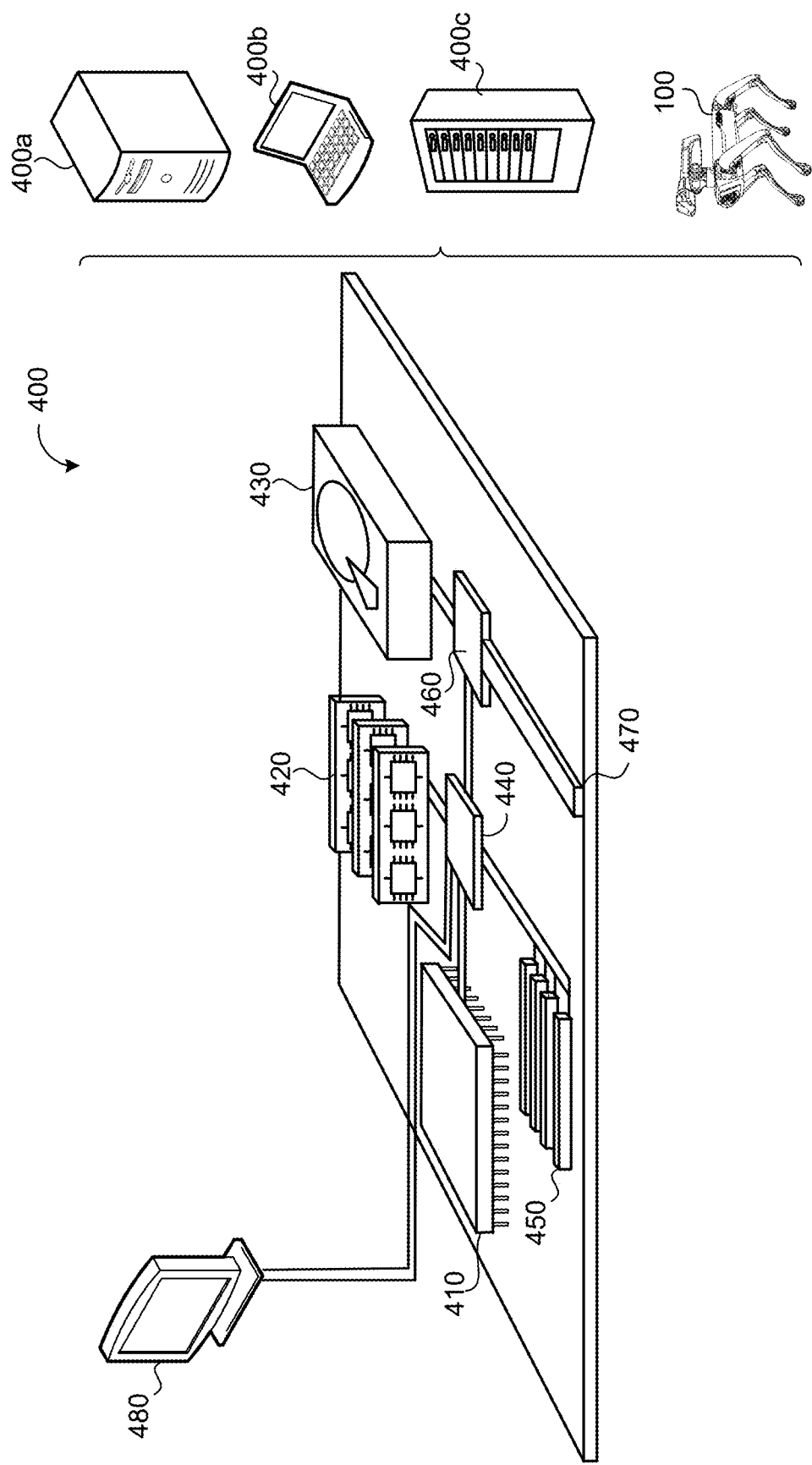
FIG. 4 is a schematic view of an example computing device that may be used to implement the systems and methods described herein.

FIG. 4 is schematic view of an example computing device 400 that may be used to implement the systems (e.g., the robot 100, the sensor system 130, the control system 170, the linear actuator 310, and/or the gripper mechanism 300) and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 500c, or as part of the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
    a body;
    four legs coupled to the body, each leg of the four legs coupled to the body at a joint configured for articulation of the leg relative to the body;
    an arm coupled to the body, the arm comprising one or more members connected by one or more joints such that the arm is configured for articulation relative to the body; and
    a gripper mechanism coupled to a distal end of the arm, the gripper mechanism comprising:
        a first jaw member and a second jaw member;
        a linear actuator coupled to the first jaw member through a pivot body and a cam, wherein actuation of the linear actuator rotates the cam to rotate the first jaw member relative to the second jaw member about a first axis, and wherein the pivot body is configured for rotation about a pivot axis to allow for rotation of the first jaw member about the pivot axis.

2. The robot of claim 1, wherein the first jaw member is rotationally fixed relative to the cam such that the first jaw member and the cam rotate together.

3. The robot of claim 1, wherein:
    the linear actuator comprises a lead screw, a motor coupled to the lead screw and configured to cause rotation of the lead screw, and a ball nut positioned on the lead screw such that the ball nut moves along an axis of the lead screw as the lead screw rotates; and
    a protrusion associated with the ball nut is positioned within a slot of the cam.

4. The robot of claim 3, wherein the slot of the cam is curved.

5. The robot of claim 3, wherein the slot of the cam comprises an involute slot.

6. The robot of claim 3, wherein the linear actuator is coupled to a carrier, the carrier comprising a carrier slot extending along a linear axis, and wherein the protrusion extends through the carrier slot.

7. The robot of claim 3, wherein the pivot body is pivotally coupled to the ball nut for rotation around the pivot axis, and wherein the protrusion extends from the pivot body.

8. The robot of claim 7, wherein the pivot axis is orthogonal to the axis of the lead screw.

9. The robot of claim 7, wherein the protrusion extends along a protrusion axis that is orthogonally oriented with respect to the pivot axis.

10. The robot of claim 9, wherein the axis of the lead screw is orthogonally oriented with respect to the pivot axis and the protrusion axis.

11. The robot of claim 7, wherein rotation of the pivot body permits rotation of the first jaw member in a direction that is different than a direction of rotation of the first jaw member driven by the linear actuator.

12. A method for actuating a gripper mechanism of a robot, the method comprising:
    actuating a linear actuator of the gripper mechanism to cause a first jaw member of the gripper mechanism to move relative to a second jaw member of the gripper mechanism, wherein:
        the linear actuator is coupled to the first jaw member through a pivot body and a cam such that actuation of the linear actuator rotates the cam to rotate the first jaw member relative to the second jaw member about a first axis, and the pivot body is configured for rotation about a pivot axis to allow for rotation of the first jaw member about the pivot axis; and
    the robot comprises:
        a body,
        four legs coupled to the body, each leg of the four legs coupled to the body at a joint configured for articulation of the leg relative to the body,
        an arm coupled to the body, the arm comprising one or more members connected by one or more joints such that the arm is configured for articulation relative to the body, and
        the gripper mechanism coupled to a distal end of the arm, the gripper mechanism.

13. The method of claim 12, wherein the first jaw member is rotationally fixed relative to the cam such that the first jaw member and the cam rotate together.

14. The method of claim 12, wherein:
    the linear actuator comprises a lead screw, a motor coupled to the lead screw and configured to cause rotation of the lead screw, and a ball nut positioned on the lead screw such that the ball nut moves along an axis of the lead screw as the lead screw rotates;
    a protrusion associated with the ball nut is positioned within a slot of the cam; and
    actuating the linear actuator comprises operating the motor to rotate the lead screw to move the ball nut along the lead screw.

15. The method of claim 14, wherein the slot of the cam is curved.

16. The method of claim 14, wherein the slot of the cam comprises an involute slot.

17. The method of claim 14, wherein the linear actuator is coupled to a carrier, the carrier comprising a carrier slot extending along a linear axis, and wherein the protrusion extends through the carrier slot.

18. The method of claim 14, wherein the pivot body is pivotally coupled to the ball nut for rotation around the pivot axis, and wherein the protrusion extends from the pivot body.

19. The method of claim 18, wherein the pivot axis is orthogonal to the axis of the lead screw.

20. The method of claim 18, wherein the protrusion extends along a protrusion axis that is orthogonally oriented with respect to the pivot axis.

21. The method of claim 20, wherein the axis of the lead screw is orthogonally oriented with respect to the pivot axis and the protrusion axis.

22. The method of claim 18, wherein rotation of the pivot body permits rotation of the first jaw member in a direction that is different than a direction of rotation of the first jaw member driven by the linear actuator.

* * * * *